Aug. 11, 1942.    R. D. MacDONALD    2,292,951
ENSILAGE CUTTER
Filed March 18, 1939    4 Sheets-Sheet 1

Inventor
Raymore D. MacDonald
By

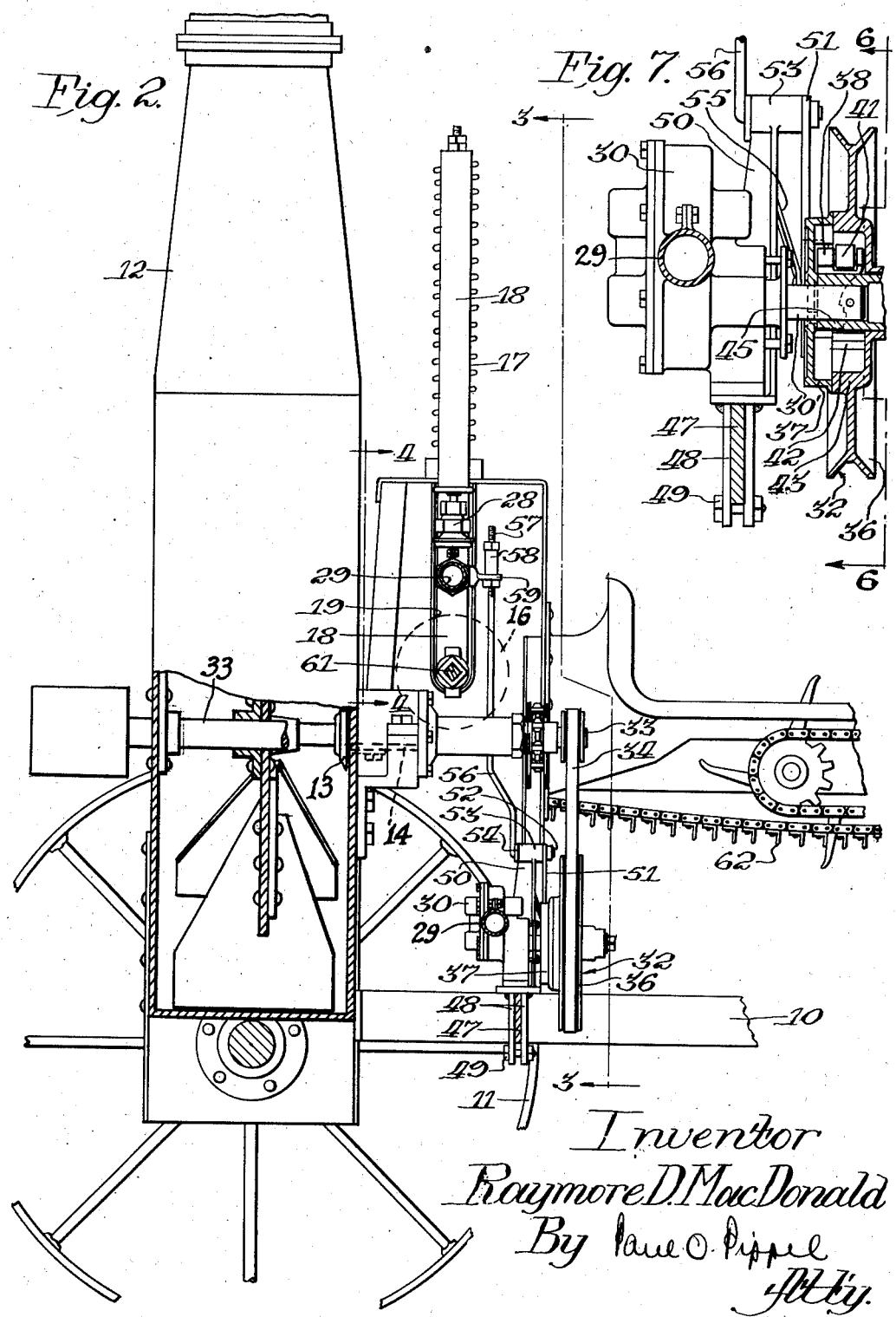

Aug. 11, 1942.  R. D. MacDONALD  2,292,951
ENSILAGE CUTTER
Filed March 18, 1939  4 Sheets-Sheet 3

Inventor
Raymore D. MacDonald
By Paul O. Tippel
Atty.

Aug. 11, 1942.     R. D. MacDONALD     2,292,951
ENSILAGE CUTTER
Filed March 18, 1939     4 Sheets-Sheet 4
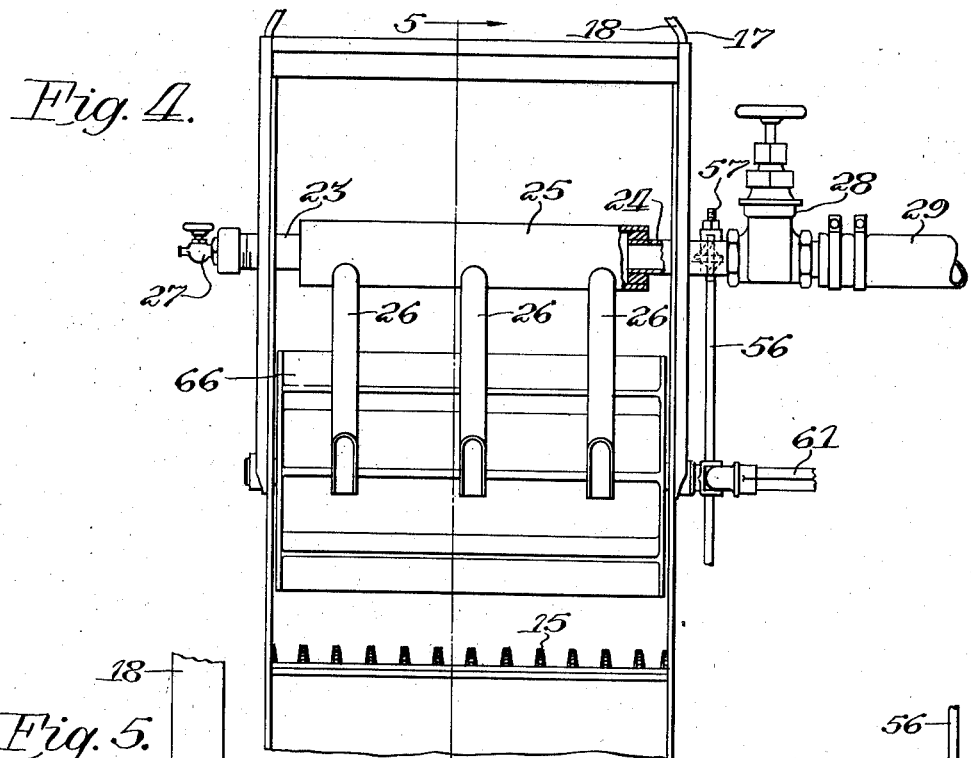
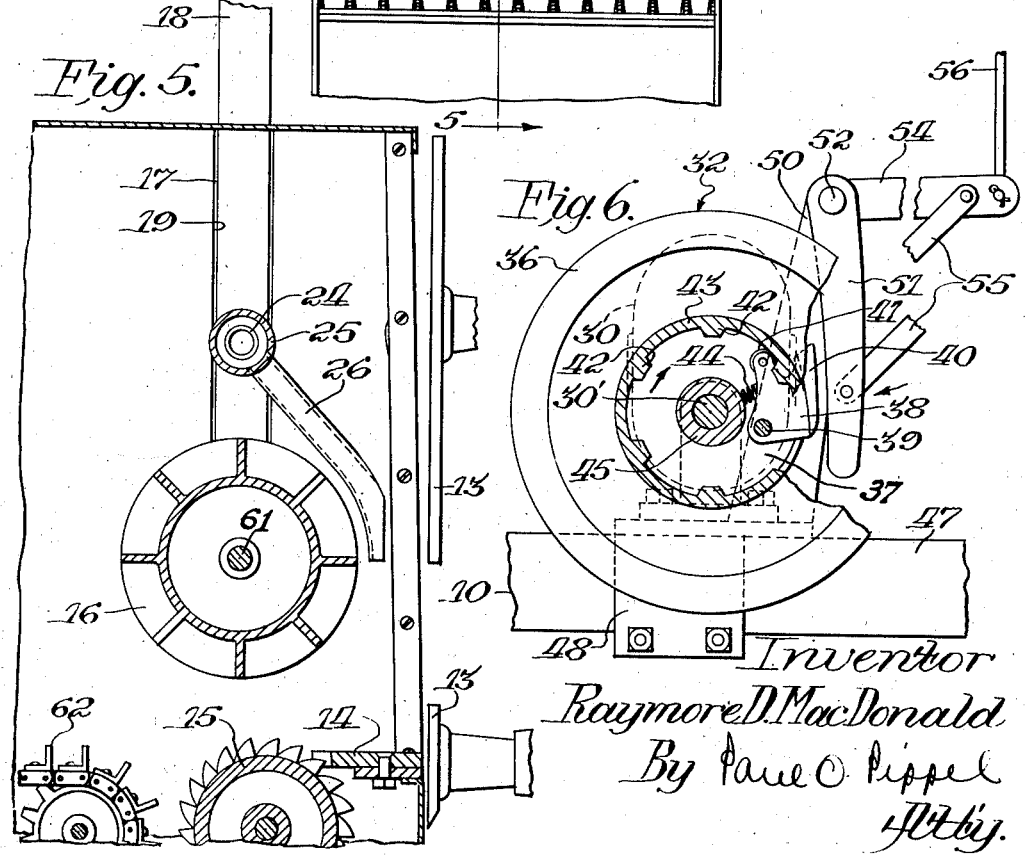
Inventor
Raymore D. MacDonald
By Paul O. Pippel
Atty.

Patented Aug. 11, 1942

2,292,951

UNITED STATES PATENT OFFICE 2,292,951

ENSILAGE CUTTER

Raymore D. MacDonald, Western Springs, Ill., assignor to International Harvester Company, a corporation of New Jersey Application March 18, 1939, Serial No. 262,740

18 Claims. (Cl. 146—107)

This invention relates to an ensilage cutter. More specifically, it relates to an attachment for feeding molasses to an ensilage cutter.

It is frequently the practice, in the preparation of ensilage from hay, to supply either water or molasses to the hay as the treating medium. It has been found desirable to introduce the treating medium to the ensilage cutter at a point immediately adjacent the cutter proper. It is also desirable to have some sort of control of the device which supplies the treating medium, so that flow of the medium will stop when there is no hay passing to the cutter to be treated.

An object of the present invention is to provide an improved ensilage cutter.

Another object is the provision of an attachment for supplying a treating medium to an ensilage cutter.

A further object is to provide a control for a feeding attachment for an ensilage cutter which will stop the flow of treating medium when no crops are fed to the cutter.

Other objects will appear from the disclosure.

According to the present invention, there are provided as parts of an ensilage cutter the cutting device itself, upper and lower feed rolls, and a means for supplying a treating medium at a point adjacent the cutter. The upper feed roll is mounted so as to have a certain vertical movement and is connected with a clutch between a source of power and a pump supplying the treating medium. With this arrangement, the upper feed roll moves to its lowermost position when no crops are fed between the rolls, and the clutch to the pump is disengaged so that the supplying of treating medium is stopped.

In the drawings:

Figure 2 is a side view partially in section;

Figure 4 is a view taken along the line 4—4 of Figure 2;

Figure 5 is a section taken along lines 5—5 of Figure 4;

Figure 6 is a view taken along the line 6—6 of Figure 7, partly in section, showing a clutch;

Figure 7 is a side view, partially in section, of the clutch and pump; and,

Figure 1:
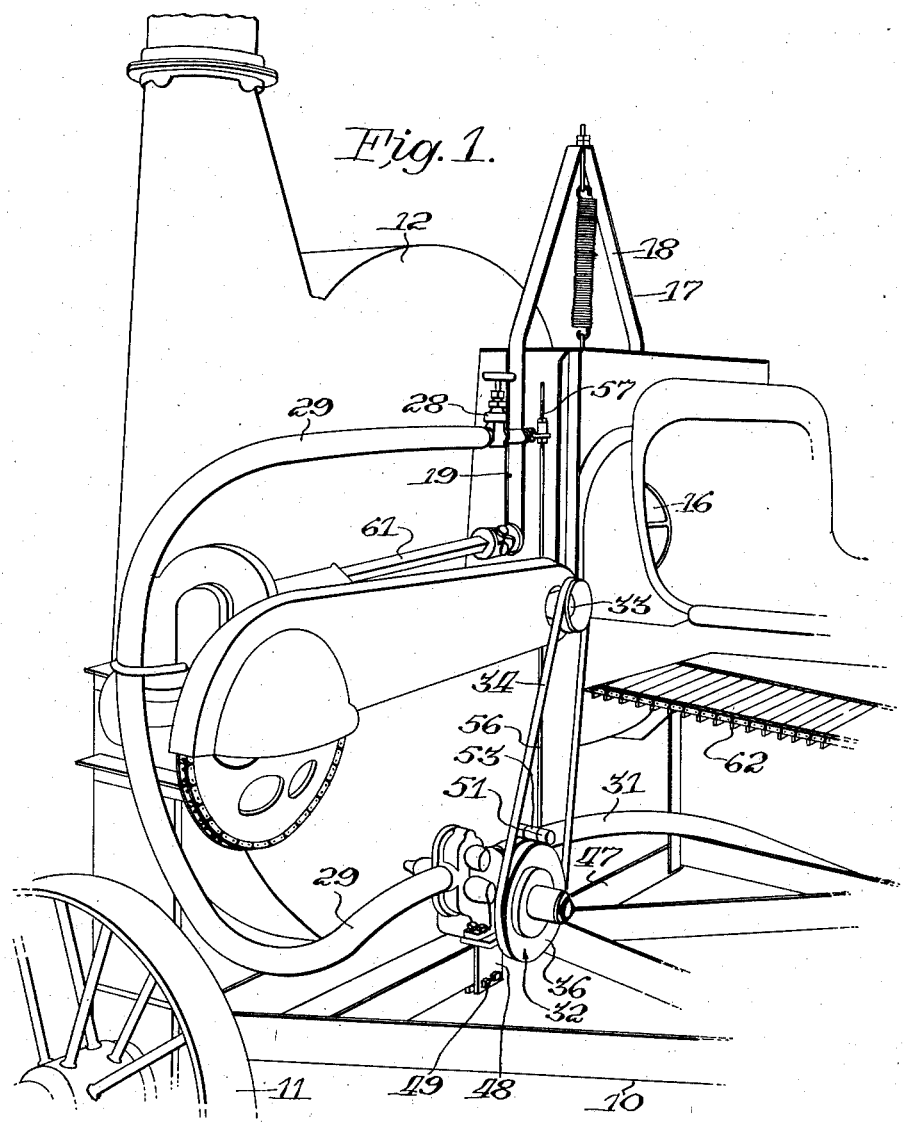
Figure 1 is a perspective view of the ensilage cutter of the present invention.
Figure 8:
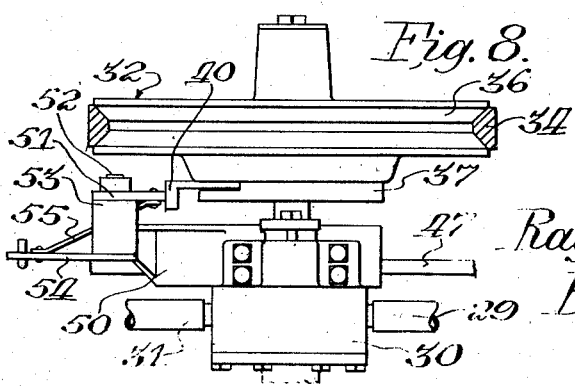
Figure 8 is a top view of the clutch and pump.
Figure 3:
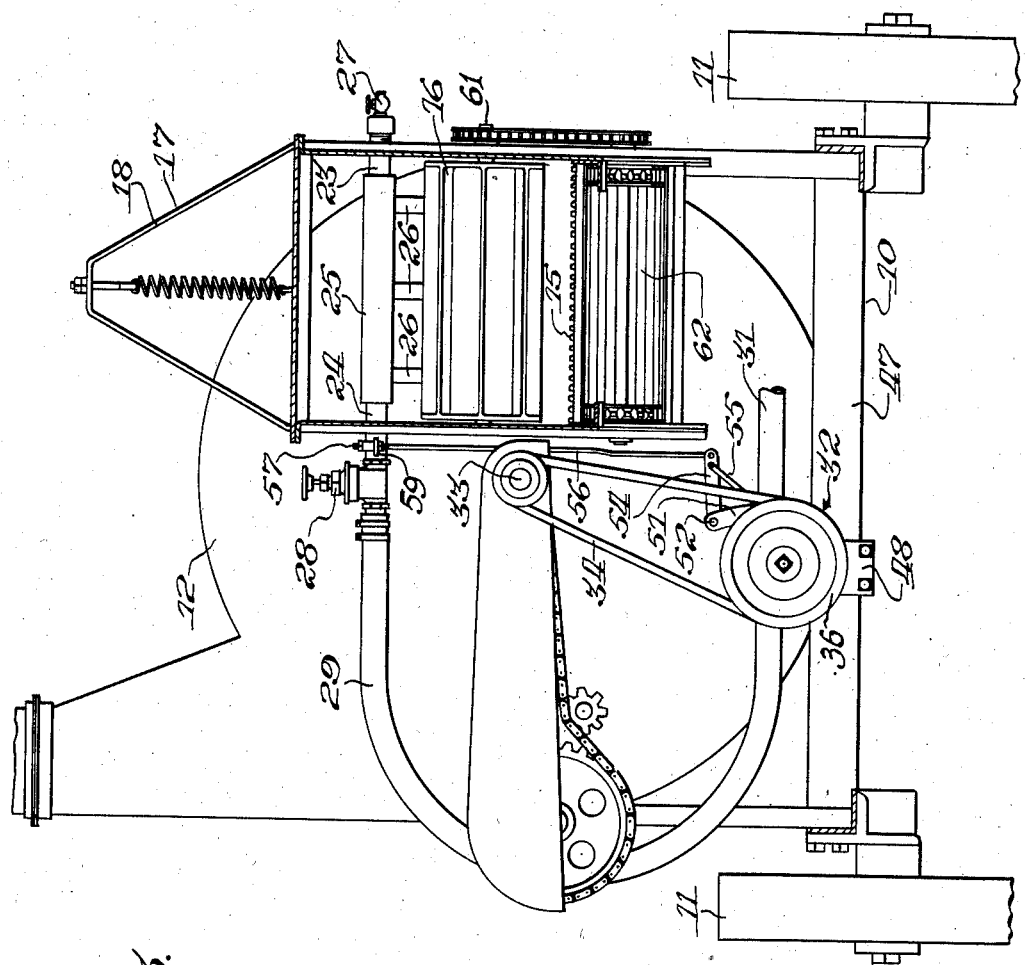
Figure 3 is a sectional elevation taken along lines 3—3 of Figure 2.

The ensilage cutter of the present invention has a framework 10 supported on wheels 11, of which only two are shown. The cutter itself comprises a housing 12 having mounted therein a rotatable member, of which only knife members 13 are shown in Figure 5. There is also a stationary cutter member 14, adjacent which is a lower feed roll 15. Reference is made to the Merwin Patent 1,246,976 dated November 20, 1917, for a more complete showing of the rotary cutter and housing. Above this lower feed roll is an upper feed roll 16 which is carried in a yoke 17 slidably mounted by means of its legs 18 in slides 19 forming part of the framework of the machine. A coil spring 22 connects the framework and the center portion of the yoke 17. Also mounted in the yoke 17 is the means for discharging a treating medium at a point adjacent the cutter. This means comprises a pair of short pipe sections 23 and 24 mounted at opposite sides of the yoke and carrying a larger pipe section 25. This section 25 has three outlet pipes 26 extending therefrom with discharge openings on the level of the upper roll 16 and between it and the cutter members 13. At the end of the pipe 23 there is provided a release valve 27. A control valve 28 is attached to the pipe 24, and to the control valve is attached a hose 29 connected also to the discharge side of a pump 30, which includes a driving shaft 30' extending therefrom. A hose 31 is attached to the intake side of the pump.

The shaft 30' has mounted thereon a clutch 32, in turn connected to a drive shaft 33 by means of a belt 34. The clutch 32 comprises a driving element 36 which is engaged by the belt 34, a driven member 37 keyed to the shaft 30', and a pawl 38 pivoted at 39 on the driven member 37. The pawl has a cam portion 40 and a roller 41 rotatably mounted on the pawl adapted to engage spaced lugs 42 on the inner surface of the hub portion 43 of the driving member 36. A compression spring 44, positioned between the pawl 38 and a hub portion 45 of the driven member 37, urges the pawl upwardly so as to cause the roller 41 to engage one of the lugs 42.

The pump 30 is mounted on a cross piece 47 forming part of the framework of the ensilage cutter by means of a pair of plates 48 and a nut-and-bolt 49. A member 50 extends upwardly from adjacent the point of connection of the pump 30 to the cross piece 47, and to the upper end thereof is pivoted an arm 51 on a pin 52. A spacer sleeve 53 is also mounted on the pin and separates the arm 51 from another arm 54. A diagonal link 55 connects the two arms so as to render them, in effect, a bell crank. A link 56 is connected at its lower end to the arm 54 and is adjustably connected at its upper end, by means of a threaded portion 57, to a threaded sleeve 58, in turn carried by a member 59 secured to the pipe 24.

The yoke 17, the roll 16, and the means for supplying a treating medium, comprising the pipes 23, 24 and 25, may be considered as a unit inasmuch as they are secured with respect to one another and have a sliding movement with respect to the rest of the ensilage cutter in the slides 19. The spring 22 tends to hold the feed roll 16 in its lowermost position. Drive for the upper feed roll is supplied by a telescopic shaft 61.

In operation crops to be treated are fed into the cutter on a conveyor 62. The feed rolls 15 and 16 feed the crops between them onto the stationary knife member 14, and the rotatable knives 13 effect chopping of the hay. With no hay passing between the rolls 15 and 16, the roll 16 occupies its lowermost position; however, the passage of hay between the rolls raises this roll. Raising of the roll 16 automatically effects raising of the yoke 17, the pipes 23, 24 and 25, as well as the rod 56. Upward movement of the rod 56 in turn causes a counter-clockwise rotation of the bell crank, comprised of the arms 51 and 54, as viewed in Figure 6, to the position of that figure. The arm 51 is out of engagement with the cam portion 40 of the pawl 38, and consequently the roller 41 of the pawl engages one of the projections 42. Thus, there is a driving connection between the driving member 32 and the driven member 37 of the clutch 39, and the clutch is engaged. Thus, the power drive from the driving shaft 33 is effective to drive the pump 30, which pumps a treating medium, such as molasses, through the hose 29, valve 28, pipes 24 and 25, and out through the discharge pipes 26 upon the hay as it passes over the stationary cutter member 14. During normal operation of the ensilage cutter, hay is being fed between the rollers 15 and 16, the roll 16 is in a raised position, and the pump is driven so as to force a treating medium out through the pipes 26 upon the hay. In the event that no hay passes between the rolls 15 and 16, the roll 16 falls to its lowermost position. Consequently, the link 56 is moved downwardly, and the arms 51 and 54 are swung clockwise, as viewed in Figure 6, and accordingly the arm 51 is moved into the path of the pawl 38 as it rotates with the driven member 37 of the clutch 32. The pawl is swung in a counter-clockwise direction, as shown in Figure 6, so that the roller moves out of engagement with a lug 42. Thus, the connection between the driving and driven parts of the clutch is broken, the pump is stopped, and no more treating medium is discharged from the pipes 26.

It will be apparent from the above description that a new and novel arrangement has been provided for controlling the supply of treating medium to an ensilage cutter. The failure of crops to arrive between the feed rolls of the cutter causes a stopping of the discharge of treating medium into the cutter. This arrangement is quite essential where the treating medium is molasses, for an excess of molasses with no crops to absorb it might tend to clog the cutter and render it unfit for use. Under the arrangement of the present invention, stopping of the passage of treating medium is effected through stopping of the pump. This is found to be a more desirable arrangement than that of shutting off a valve, for molasses is sticky and flows very slowly and would tend to clog the valve, making its opening difficult.

Another novel feature is the support of the molasses discharge pipe in the yoke carrying the upper feed roll. With this arrangement, the pipe rises and falls with the feed roll, keeping out of its way, and the discharge is always at the same level with respect to the upper feed roll.

The intention is to limit the invention only within the terms of the appended claims.

What is claimed is:

1. A crop-treating device comprising means for feeding crops, means adapted to be driven for supplying a treating medium to the crops fed by the crop-feeding means, and means connecting the crop-feeding means and the treating-medium-supplying means for automatically stopping the driving of the last mentioned means upon failure of the crops to arrive at the crop-feeding means.

2. A crop-treating device comprising means for feeding crops including a pair of spaced elements which are relatively movable toward and away from each other and between which crops pass, means adapted to be driven for supplying a treating medium to the crops fed by the crop-feeding means, driving means therefor, and means connecting the crop-feeding means and the treating-medium-supplying means for stopping the driving of the last mentioned means upon change in the spacing of the elements of the crop-feeding means occasioned by failure of crops to arrive at the crop-feeding means.

3. A crop-treating device comprising means for feeding crops including a pair of spaced elements movable toward and away from each other and adapted to pass crops between them, means adapted to be driven for supplying a treating medium to the crops passed by the spaced elements, driving means therefor, and means connecting one element of the crop-feeding means and the treating-medium-supplying means for stopping the driving of the latter upon movement of the said element toward the other element occasioned by failure of crops to arrive at and pass between the elements.

4. A crop-treating device comprising upper and lower feed rolls movable toward and away from each other and adapted to have crops fed between them, means adapted to be driven for supplying a treating medium to the crops passed between the rolls, driving means therefor, and means connecting one roll and the said means for stopping the driving of the latter upon movement of the said roll toward the other roll.

5. A crop-treating device comprising a crop-feeding means, means adapted to be driven for supplying a treating medium to the crops, driving means therefor, a clutch connecting the last two means, and means connecting the crop-feeding means and the clutch for automatically disengaging the clutch upon failure of crops to arrive at the crop-feeding means.

6. A crop-treating device comprising a pair of spaced feeding rolls which are relatively movable toward and away from one another and between which crops are passed, means adapted to be driven for supplying a treating medium to the crops passed between the feed rolls, driving means therefor, a clutch connecting the two means, and means connecting one roll and the clutch for disengaging the clutch upon movement of the said one roll toward the other roll because of failure of the crops to arrive at the feed rolls for passage therebetween.

7. A crop-treating device comprising upper and lower feed rolls which are relatively movable toward and away from one another and between which crops are passed, a pump for supplying a treating medium to the crops passed between the feed rolls, driving means therefor, a clutch connecting the pump and driving means, and means connecting the upper feed roll and the clutch for disengaging the clutch upon dropping of the upper feed roll because of failure of the crops to arrive at the feed rolls for passage therebetween.

8. A crop-treating device comprising a frame, upper and lower feed rolls, said upper roll being adapted to be raised by crops fed between said rolls, means adapted to be driven for supplying a treating medium to crops fed between said rolls, driving means therefor, a clutch connecting the two means, and means for disengaging the clutch upon lowering of the upper feed roll, said means comprising a link operatively connected at one end to the upper feed roll and a bell crank pivoted on the frame and having one arm connected to the link and the other arm adjacent the clutch so as to bear thereagainst for disengagement thereof upon angular movement of the bell crank occasioned by lowering of the upper feed roll and consequent movement of the link.

9. A crop-treating device comprising a frame, upper and lower feed rolls, said upper roll being adapted to be raised by crops fed between said rolls, means adapted to be driven for supplying a treating medium to the crops fed between said rolls, driving means therefor, a clutch connecting the two means including a driving element, a driven element, and a pawl pivoted on the driven element and adapted to engage the driving element, and a member pivotally mounted on the frame in a position to contact the pawl and operatively connected to the upper feed roll so as to effect disengagement of the clutch by movement against the pawl because of lowering of the upper feed roll.

10. A crop-treating device comprising a feeding means including a pair of spaced elements adapted to be relatively moved towards and away from each other by crops fed between said elements, means adapted to be driven for supplying a treating medium to the crops fed between said elements, driving means therefor, a clutch connecting the last two means comprising a driving element, a driven element, and a pawl mounted on the driven element and engaging the driving element, and means connected to the crop-feeding means and positioned adjacent the clutch so as to move the pawl out of engagement with the driving element upon decrease in the spacing of the elements.

11. In an ensilage producer, a frame, a cutter member secured to the frame, a rotary cutter mounted on the frame in cooperative relation with the cutter member, upper and lower feed rolls positioned adjacent the cutter member, the upper roll being adapted to be raised by passage of crops between the rolls, a pipe positioned over the upper feed roll and having a plurality of discharge outlets, a pump connected with the pipe, driving means for the pump, a clutch connecting the driving means and the pump, and means connecting the upper feed roll and the clutch for disengaging the clutch upon lowering of the upper feed roll.

12. In a device for producing ensilage from crops, a frame, a cutting device mounted on the frame, a lower feed roll rotatably mounted on the frame adjacent the cutting device, a unit movably mounted on the frame and comprising an upper feed roll, a discharge pipe, and a supporting member for both pipe and roll, a pump connected to the pipe, driving means therefor, a clutch connecting the driving means and the pump, and means connecting the clutch and the movably mounted unit for causing disengagement of the clutch upon lowering of the unit caused by failure of the crops to arrive at the rolls.

13. A crop-treating device comprising means for feeding crops, conduit means for conducting fluid therethrough and discharging it at one end at the crops fed by the crop-feeding means, driven means in the conduit means for forcing fluid therethrough, and means connected with the crop-feeding means and responsive to failure of the crops to arrive at the crop-feeding means automatically to stop the discharge of fluid from the said one end of the conduit means at the crops fed by the crop-feeding means without increase in the pressure of the fluid in the portion of the conduit means between the driven means and the said one end.

14. A crop-treating device comprising a pair of spaced feeding rolls which are relatively movable toward and away from each other and between which crops are passed, conduit means for conducting a fluid therethrough and discharging it at one end at the crops, a pump for forcing fluid through the conduit means, and means connected with one roll and operative upon movement of the said one roll toward the other roll because of failure of the crops to arrive at the feed rolls for passage therebetween to stop the discharge of fluid from the said one end of the conduit means without increase in the pressure of fluid in the portion of the conduit means between the pump and the said one end.

15. The combination with a roughage mill having a feeding means, a supplemental floating feeding means operatively associated with said first named means for feeding material therebetween, a liquid supply conduit for discharging a liquid into the material comminuted by said mill, a pump mounted in said liquid supply line for creating a pressure on said liquid, and operative connections between said pump and said supplemental feeding means controlling the amount of liquid discharged into the material comminuted by said roughage mill.

16. The combination with a roughage mill having a feeding means, a supplemental floating feeding means operatively associated with said first named means for feeding material therebetween, a liquid supply conduit for discharging a liquid into the material comminuted by said mill, a pump driven by said roughage mill and mounted in said liquid supply line for creating a pressure on said liquid, and operative connections between said pump and said supplemental feeding means for controlling the pressure on said liquid.

17. The combination with a roughage mill having a feeding means, a supplemental floating feeding means operatively associated with said first named means for feeding material therebetween, a liquid supply conduit for discharging a liquid into the material comminuted by said mill, a pump mounted in said conduit for creating a pressure on the liquid therein, and operative connections between said pump and said supplemental feeding means whereby the amount of material passing through said feeding means controls the pressure on the liquid in said conduit.

18. The combination with a roughage mill having feeding means, a supplemental floating feeding means operatively associated with said first named means for feeding material therebetween, a liquid supply conduit for discharging a liquid into the material comminuted by said mill, a pump mounted in said conduit for creating a pressure in said liquid, a pressure gauge associated with said conduit for indicating the pressure therein, and operative connections between said pump and said supplemental feeding means whereby the amount of material passing through said feeding means controls the pressure on the liquid in said conduit.

RAYMORE D. MacDONALD.